(12) United States Patent
Ichino

(10) Patent No.: US 6,418,816 B1
(45) Date of Patent: Jul. 16, 2002

(54) POWER TRANSMISSION DEVICE

(75) Inventor: Kazushige Ichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 09/669,804

(22) Filed: Sep. 26, 2000

(51) Int. Cl.[7] ................................................. F16H 1/22
(52) U.S. Cl. ................................ 74/665 GA; 74/665 P
(58) Field of Search ................................. 475/149, 331, 475/338; 74/332, 354, 810.1, 665 GA, 665 P; 396/418

(56) References Cited

U.S. PATENT DOCUMENTS

| | | | | |
|---|---|---|---|---|
| 1,740,010 A | * | 12/1929 | Englehardt | 475/175 |
| 2,187,181 A | * | 1/1940 | Shackleford | 188/170 |
| 4,959,672 A | * | 9/1990 | Yoshino et al. | 242/349 |
| 5,262,810 A | * | 11/1993 | Yoshino et al. | 242/340 |
| 5,298,930 A | * | 3/1994 | Asakura et al. | 396/155 |
| 6,085,043 A | * | 7/2000 | Okuno | 396/132 |
| 6,170,999 B1 | * | 1/2001 | Okuno | 396/413 |

FOREIGN PATENT DOCUMENTS

| JP | 8-69026 A | * | 3/1996 |
|---|---|---|---|

* cited by examiner

*Primary Examiner*—Charles A Marmor
*Assistant Examiner*—Ankur Parekh
(74) *Attorney, Agent, or Firm*—Robin, Blecker & Daley

(57) ABSTRACT

A power transmission device includes a motor, a first gear member having an internal gear and an external gear, wherein an output of the motor is transmitted to the internal gear to rotate the first gear member, a planet gear member having a first gear part having a smaller diameter and a second gear part having a larger diameter, wherein the second gear part engages with the external gear of the first gear member, and the planet gear member revolves around an axis of rotation of the first gear member, and a driven member having an internal gear part, wherein the driven member is driven by the first gear part of the planet gear member engaging with the internal gear part of the driven member with the planet gear member having revolved.

1 Claim, 4 Drawing Sheets

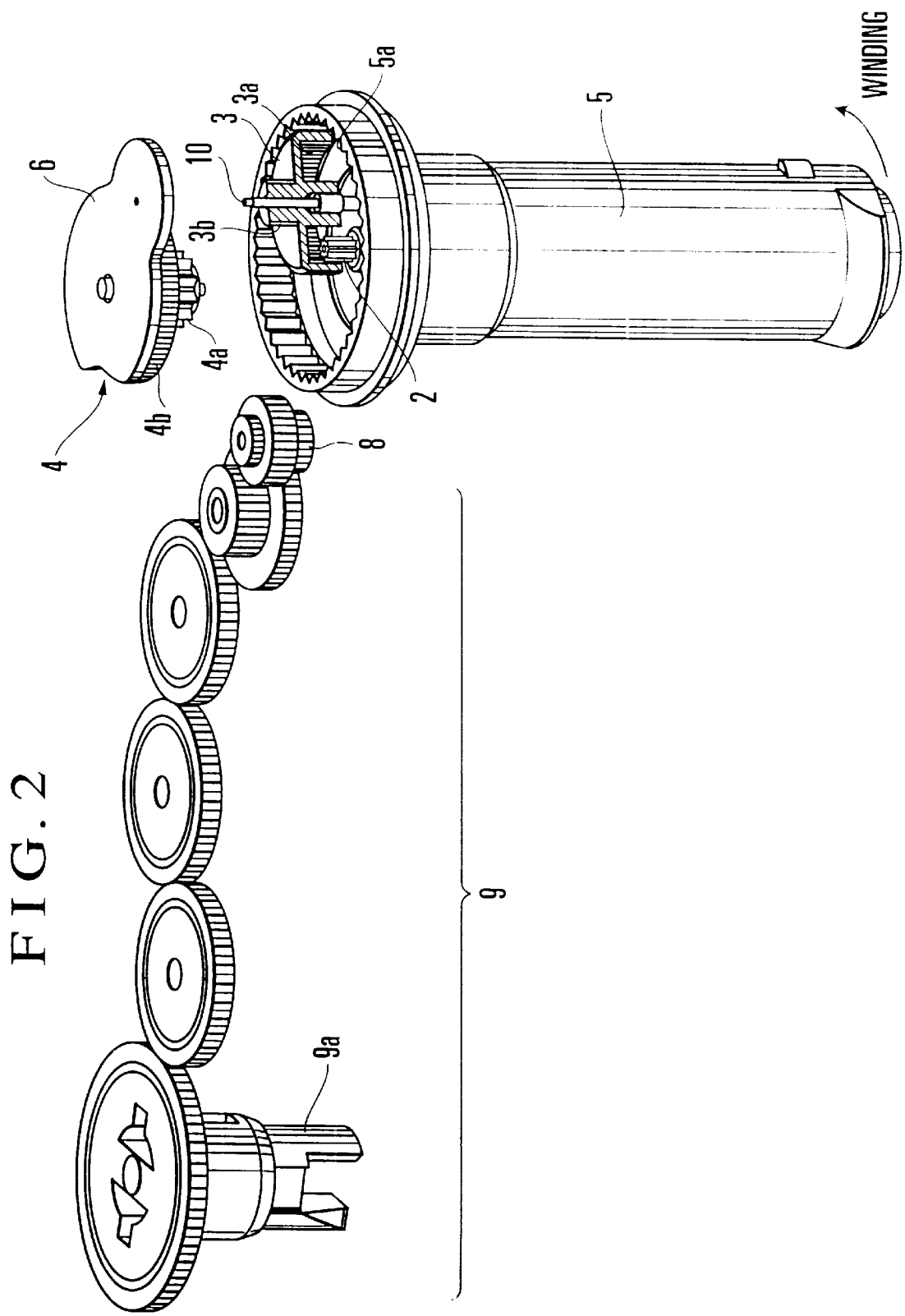

POWER TRANSMISSION DEVICE

BACKGROUND OF THE INVENTION

1. Field of the Invention

The present invention relates to a power transmission device for transmitting the rotational force of a motor to a driven member. In particular, the present invention relates to a power transmission device adapted to be used in a film transport device for an optical apparatus, such as a camera or a film viewing apparatus.

2. Description of Related Art

Hitherto, an automatic-winding-type camera has a film transport device in which the rotational speed of a motor is reduced by a plurality of gears so as to rotate a film winding spool by a large rotational force.

Recently, the rotational forces of motors have been reduced as the motors and batteries have been reduced in size due to reduction in sizes of cameras. Therefore, the speed of the motors must be reduced at a large reduction ratio so as to rotate spools by a desired rotational force. In order to reduce the rotational speed of a motor, a plurality of two-stage gears, each of which is composed of two gear parts coaxially integrally formed to have different numbers of teeth, are generally used. The following methods using the two-stage gears to obtain a large reduction ratio are known.

(i) A method in which a large number of two-stage gears are used.

(ii) Another method in which a relatively small number of two-stage gears are used, each having gear parts differing greatly from each other in the number of teeth.

In power transmission through gears, power loss during transmission generally occurs at engaging parts of the gears. Therefore, as the number of engaging parts, that is, the number of gears, increases, the efficiency in power transmission decreases. Accordingly, in the method (i) described above, there is a problem in that although a large reduction ratio can be obtained, the efficiency in power transmission is lowered due to the large number of two-stage gears, the rotational force transmitted to a spool thereby becoming small. In order to overcome this problem, the reduction ratio may be further increased. However, when the reduction ratio is excessively large, even if the desired rotational force is transmittable to the spool, the rotational speed of the spool becomes very low, so that the film winding speed would be lowered.

On the other hand, in the above method (ii), if the number of gears used is reduced by using the two-stage gears having a large difference in the number of teeth between the two gear parts constituting each two-stage gear, the efficiency of power transmission can be prevented from being lowered. However, the larger gear part of the two gear parts constituting the two-stage gear must be made sufficiently large to provide such a large difference in the number of teeth, whereby the distance between axes of the two-stage gears is increased, thereby increasing the space as viewed in a direction of the axes of the gears. Then, power transmission devices described below have been proposed in order to overcome these problems.

FIGS. 3(a) and 3(b) show one of the power transmission devices as proposed. In the power transmission device shown in FIGS. 3(a) and 3(b), the rotational force of a motor 11 is transmitted by a pinion gear 12 fixed thereto to an internal gear 13a which is the larger gear part of an intermediate two-stage gear 13. Then, the rotational force of a gear 13b which is the smaller gear part of the intermediate two-stage gear 13 is transmitted to an internal gear 14a provided at a spool 14.

The power transmission device is provided with only two engaging parts of the gears, thereby significantly reducing power loss during transmission. In the power transmission device, with the internal gears used, the distance between axes of the gears does not need to be large, as compared with a case where external gears having the same number of teeth are used. As shown in FIG. 3(b), the intermediate two-stage gear 13 can be disposed close to the pinion gear 12 as viewed in a direction of the axes of the gears.

However, with the arrangement described above, although the arrangement offers an advantage regarding the winding of film by the spool 14, since the rotational force of the motor 11 in a forward or backward direction is transmitted to the spool 14 as it is, a configuration of the spool 14 must be devised, for example, to be divided into two pieces with regard to the rewinding of film.

FIGS. 4(a) and 4(b) show another proposed power transmission device. In the power transmission device shown in FIGS. 4(a) and 4(b), the rotational force of a motor 21 is transmitted by a pinion gear 22 fixed thereto to an internal gear 25a provided at a spool 25, while, during transmission, the rotational speed of the motor 21 is reduced by a two-stage sun gear 23 and, then, by a two-stage planet gear 24.

In FIG. 4(b), with a connecting arm 26 connecting the two-stage sun gear 23 and the two-stage planet gear 24 and a friction spring 27 used, the two-stage planet gear 24 revolves clockwise and counterclockwise around the two-stage sun gear 23.

When the two-stage planet gear 24 revolves clockwise and engages with the internal gear 25a of the spool 25, the winding of film can be performed, and when the two-stage planet gear 24 revolves counterclockwise and engages with a rewinding gear 28, the rewinding of film can be performed.

With this arrangement, although one gear is added to the configuration shown in FIGS. 3(a) and 3(b), the winding and rewinding of film can be performed by using a simple planetary mechanism.

With the above-described arrangement, a gear part of the two-stage planet gear 24 engages with the internal gear 25a of the spool 25 by revolving at the time of the winding of film, so that the two-stage planet gear 24 can be disposed approximately inside the internal gear 25a as viewed in a direction of the axis thereof, as shown in FIG. 4(b). That is, if an engaging gear of the spool is disposed at the outer periphery thereof, the two-stage planet gear 24 must naturally revolve in the outer area of the spool so as to engage with the external gear of the spool. Therefore, the space for the gear train must be enlarged for the revolving area for the two-stage planet gear 24. With the arrangement described above, the space can be reduced due to the provision of the internal gear 25a of the spool 25.

In the conventional power transmission devices shown in FIGS. 3(a) and 3(b) and FIGS. 4(a) and 4(b), the rotational force of the motors can be amplified and transmitted to the spools while maintaining transmission efficiency by reducing the number of gears used. However, there are the following problems regarding the "breadth" as viewed in a direction of the axes of the gears, as shown in FIGS. 3(b) and 4(b), and regarding the "thickness" as viewed in a direction perpendicular to the axes of the gears, as shown in FIGS. 3(a) and 4(a).

The thickness of the power transmission device shown in FIGS. 3(a) and 3(b) is the minimum required for a two-stage gear, which is the sum of thicknesses "A" and "B" required for two engaging parts, as shown in FIG. 3(a).

However, as is understandable from FIG. 3(b), the internal gear 13a of the intermediate two-stage gear 13 protrudes from the periphery of the spool 14 by an amount "C", thereby increasing the breadth by the amount "C".

Further, in the power transmission device shown in FIGS. 4(a) and 4(b), the two-stage planet gear 24 does not significantly protrude from the spool 25, as shown in FIG. 4(b). The power transmission device shown in FIGS. 4(a) and 4(b) offers an advantage regarding the space as compared with that shown in FIGS. 3(a) and 3(b).

However, the thickness of the power transmission device shown in FIGS. 4(a) and 4(b), which is the sum of thicknesses "D", "E" and "F" required for three engaging parts as shown in FIG. 4(a), is greater than that of the device shown in FIGS. 3(a) and 3(b). This is because the configuration must be devised so that a larger gear part 23a of the two-stage sun gear 23 does not interfere with the internal gear 25a of the spool 25 at a position "G".

Then, in order to avoid such interference, the thickness may be reduced by reducing the size of the larger gear part 23a of the two-stage sun gear 23 so that the larger gear part 23a is lowered up to the same level in height as that of the internal gear 25a of the spool 25. However, in this arrangement, there is a disadvantage that the required reduction ratio will not be obtained.

Further, in order to avoid this problem, a larger gear part 24a of the two-stage planet gear 24 may be enlarged. However, in this arrangement, the larger gear part 24a of the two-stage planet gear 24 protrudes from the spool 25 as viewed in a direction of the axes of the gears, thereby causing the same problem as that in the power transmission device shown in FIGS. 3(a) and 3(b).

BRIEF SUMMARY OF THE INVENTION

Accordingly, it is an object of the present invention to provide a power transmission device which is reduced in size in breadth and thickness and which is capable of obtaining a large reduction ratio by using a small number of gears with reduced loss in power transmission. It is another object of the present invention to provide a film transport device using the power transmission device for winding and rewinding film.

To attain the above objects, in accordance with an aspect of the present invention, there is provided a power transmission device, comprises a motor, a first gear member having an internal gear and an external gear, wherein an output of the motor is transmitted to the internal gear to rotate the first gear member, a planet gear member having a first gear part having a smaller diameter and a second gear part having a larger diameter, wherein the second gear part engages with the external gear of the first gear member, and the planet gear member revolves around an axis of rotation of the first gear member, and a driven member having an internal gear part, wherein the driven member is driven by the first gear part of the planet gear member engaging with the internal gear part of the driven member with the planet gear member having revolved.

In addition, the power transmission device further comprises a second driven member having a gear part, wherein the second driven member is driven by the second gear part of the planet gear member engaging with the gear part of the second driven member with the planet gear member having revolved in an opposite direction.

Further, in the power transmission device, the driven member is a cylindrical spool for winding a film thereon, and the motor is disposed inside the spool.

Further, in the power transmission device, the internal gear of the first gear member is larger in diameter than the external gear thereof.

In addition, the power transmission device further comprises a connecting arm for connecting the first gear member and the planet gear member.

Further, in the power transmission device, the second driven member is a film spool shaft for transporting a film provided in a film cartridge.

These and further objects and features of the present invention will become apparent from the following detailed description of preferred embodiments thereof taken in conjunction with the accompanying drawings.

BRIEF DESCRIPTION OF THE SEVERAL VIEWS OF THE DRAWING

FIG. 2 is a perspective view of a film transport device including the power transmission device shown in FIGS. 1(a) and 1(b).

DETAILED DESCRIPTION OF THE INVENTION

Figure 1A:
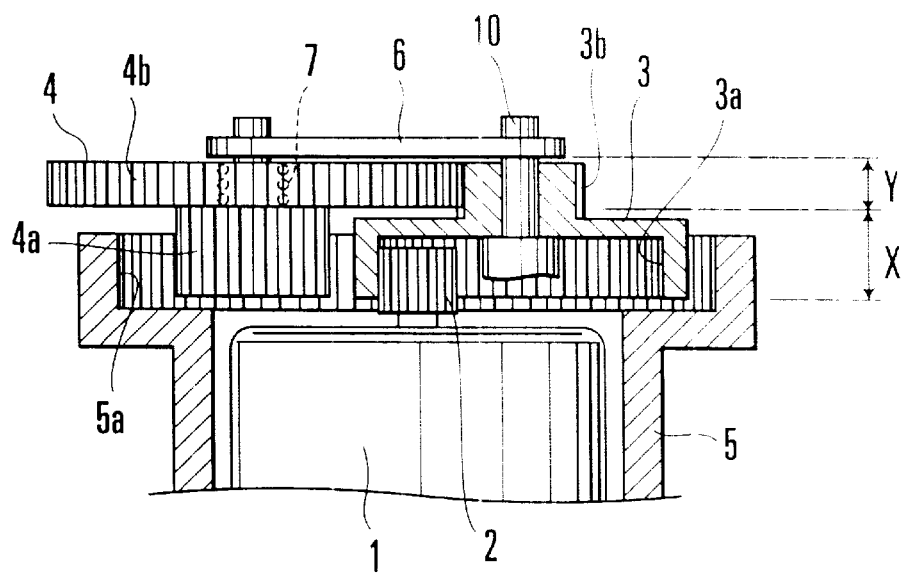
FIGS. 1(a) and 1(b) are diagrams showing the construction of a power transmission device according to an embodiment of the present invention.

Hereinafter, a preferred embodiment of the present invention will be described in detail with reference to the drawings.

First, FIG. 2 shows the construction of a film transport device using a power transmission device according to the embodiment of the present invention. The film transport device is mounted in an optical apparatus using a film, such as a camera or a film viewing apparatus.

Referring to FIG. 2, a film winding spool 5 is provided with an internal gear 5a, which is integrally formed at the inner side of the upper end of the spool 5. A pinion gear 2 is press-fitted on an output shaft of a motor 1 (see FIG. 1(a)) which is disposed inside the spool 5. A two-stage sun gear 3 is composed of a larger-diameter internal gear part 3a and a smaller-diameter external gear part 3b formed integrally with each other.

A planetary arm 6 is mounted in such a way as to be turnable (revolvable) around a gear shaft 10 of the two-stage sun gear 3. On the fore end part of the planetary arm 6, there is mounted a two-stage planet gear 4 in such a way as to be rotatable. The two-stage planet gear 4 is composed of a smaller-diameter external gear part (first gear part) 4a and a larger-diameter external gear part (second gear part) 4b formed integrally with each other. The pinion gear 2, the two-stage sun gear 3, the two-stage planet gear 4, and the planetary arm 6 constitute the power transmission device according to the present embodiment.

A rewinding rear 8 and gears 9 constitute a rewinding gear train for transmitting a driving force to a fork 9a, which is arranged to engage with a spool provided in a film cartridge (not shown). To the rewinding gear 8, a driving force from the external gear part 4b of the two-stage planet gear 4 is transmitted, as will be described below.

Next, the operation of the power transmission device will be described with reference to FIGS. 1(a) and 1(b). When the motor 1 operates to rotate the pinion gear 2 clockwise as viewed in FIG. 1(b), the rotational force of the pinion gear 2 is transmitted to the internal gear part 3a of the two-stage sun gear 3, thereby rotating the two-stage sun gear 3 clockwise.

When the two-stage sun gear 3 clockwise rotates, the planetary arm 6 and the two-stage planet gear 4 revolves clockwise by the frictional force generated by a friction spring 7 disposed between the planetary arm 6 and the two-stage planet gear 4. Then, when the external gear part 4a of the two-stage planet gear 4 engages with the internal gear 5a of the spool 5, the two-stage planet gear 4 stops revolving and, then, starts rotating counterclockwise.

When the two-stage planet gear 4 starts rotating, the rotation of the two-stage planet gear 4 is transmitted to the internal gear 5a of the spool 5, so that the spool 5 is driven to rotate counterclockwise. Thus, the rotation of the motor 1 with the speed thereof reduced is transmitted to the spool 5, so that the film is driven to be wound.

Figure 1B:
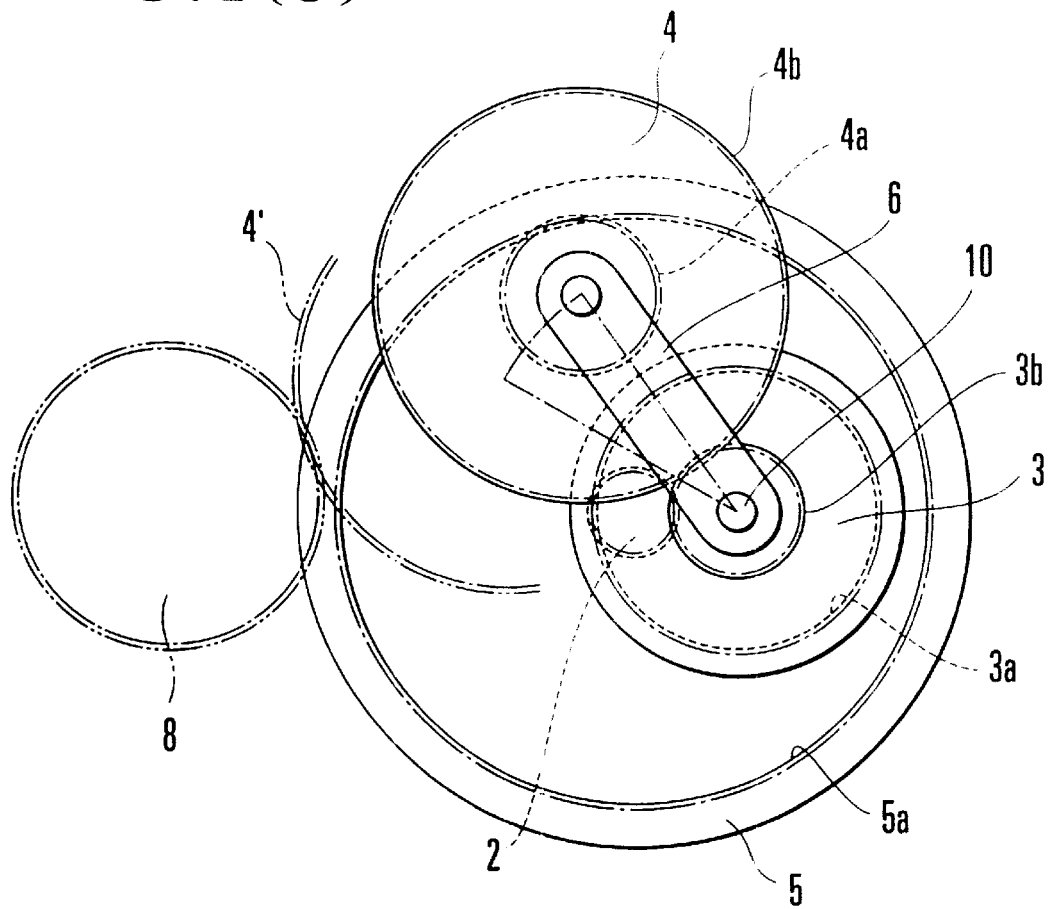

On the other hand, when the motor 1 operates to rotate the pinion gear 2 counterclockwise as viewed in FIG. 1(b), the rotational force of the pinion gear 2 is transmitted to the internal gear part 3a of the two-stage sun gear 3, thereby rotating the two-stage sun gear 3 counterclockwise.

When the two-stage sun gear 3 rotates counterclockwise, the planetary arm 6 and the two-stage planet gear 4 revolves counterclockwise by the frictional force generated by the friction spring 7. Then, when the external gear part 4b of the two-stage planet gear 4 engages with the rewinding gear 8, the two-stage planet gear 4 stops revolving and, then, starts rotating clockwise.

When the two-stage planet gear 4 starts rotating, the rotation of the two-stage planet gear 4 is transmitted to the rewinding gear train including the rewinding gear 8 and the gears 9, so that the fork 9a is driven to rotate. Thus, the rotation of the motor 1 with the speed thereof reduced is transmitted to the spool disposed in the film cartridge, with which the fork 9a engages, so that the film is driven to be rewound.

According to the present embodiment, since the larger gear part of the two-stage sun gear 3 is formed as the internal gear 3a, the distance between the axes of the two-stage sun gear 3 and the pinion gear 2 can be reduced. With this arrangement, as shown in FIG. 1(b), the two-stage sun gear 3 is disposed inside the internal gear 5a of the spool 5 as viewed in a direction of the axis thereof, so that the "breadth" of the power transmission device can be made small.

In addition, the major portion of a speed reducing system (the pinion gear 2, the two-stage sun gear 3, the two-stage planet gear 4, and a part of the rewinding gear 8 of the rewinding gear train) in the film transport device can be disposed inside the internal gear 5a of the spool 5 as viewed in a direction of the axis thereof. Therefore, the breadth of the film transport device also can be reduced.

Beside, with this arrangement, the major portion of the larger gear part of the two-stage sun gear 3 in a direction of the axis thereof can be disposed in a space inside the internal gear 5a of the spool 5 while avoiding the interference with the internal gear 5a of the spool 5. More specifically, the position of the two-stage sun gear 3 and that of the two-stage planet gear 4 are lowered, so that the internal gear part 3a of the two-stage sun gear 3 and the internal gear 5a of the spool 5 are disposed at approximately the same position in a direction of the axis thereof. Then, according to the present embodiment, the engaging part of the internal gear part 3a of the two-stage sun gear 3 with the pinion gear 2 and the engaging part of the external gear part 4a of the two-stage planet gear 4 with the internal gear 5a of the spool 5 are disposed at approximately the same position in a direction of the axis thereof.

Accordingly, the thickness between the bottom surface of the internal gear 5a of the spool 5 and the upper surface of the internal gear part 3a of the two-stage sun gear 3 can be limited to a distance "X" which is equal to the sum of the thickness of the internal gear part 3a of the two-stage sun gear 3 and the gap required to be provided between the two-stage sun gear 3 and the spool 5. In addition, according to this arrangement, the thickness between the bottom surface of the internal gear 5a of the spool 5 and each of the upper surfaces of the two-stage sun gear 3 and the two-stage planet gear 4 engaging with each other can be limited to a minimum thickness to be obtained when two-stage gears are used, which is equal to the sum of the distance "X" and a distance "Y", as shown in FIG. 1(a).

Figure 3A:
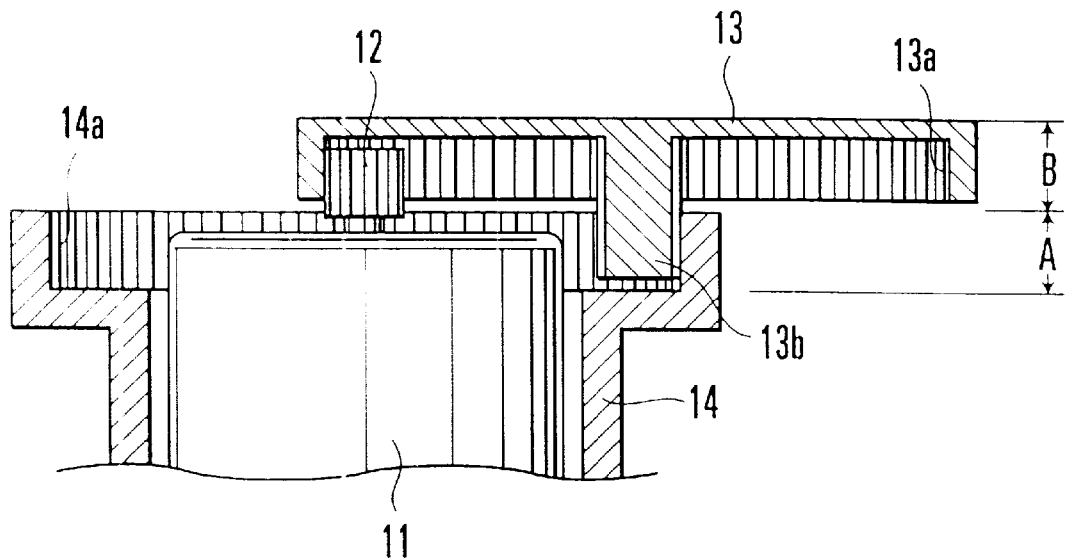
FIGS. 3(a) and 3(b) are diagrams showing the construction of a conventional power transmission device.
Figure 3B:
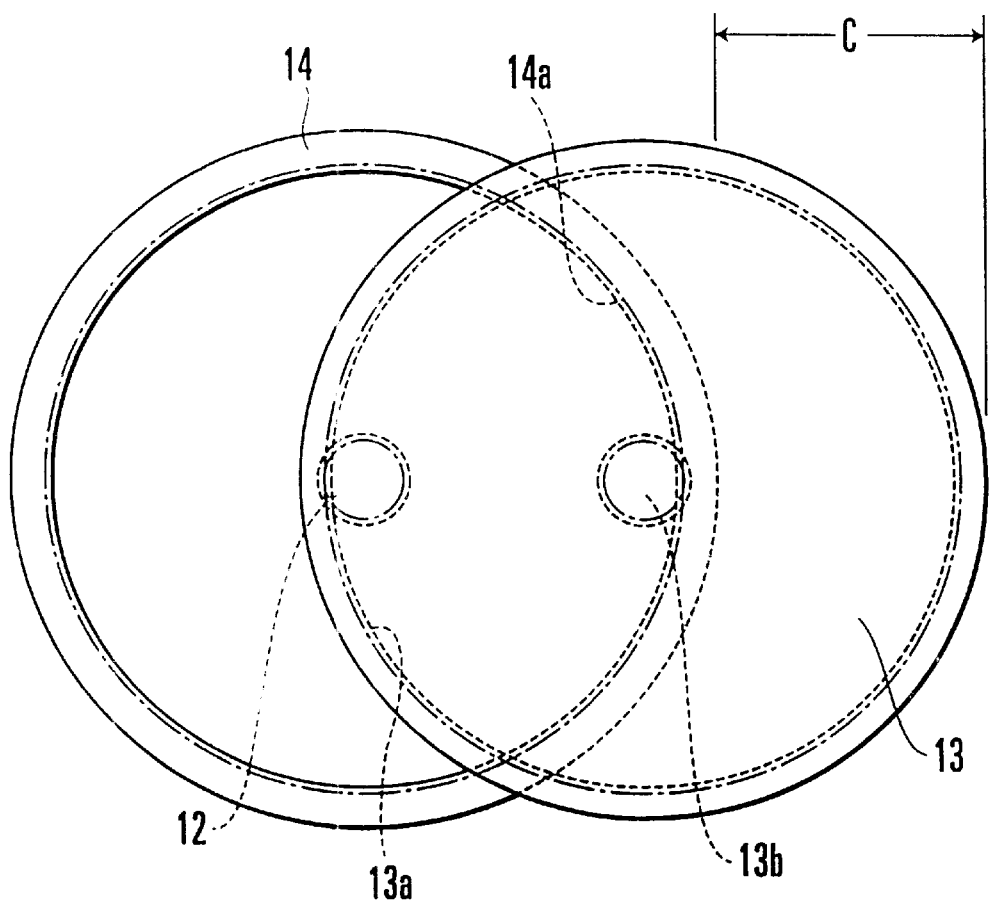

This arrangement means that the power transmission device according to the present embodiment has the advantage equivalent to that of the conventional power transmission device shown in FIGS. 3(a) and 3(b) which has the reduced thickness thereof.

In addition, according to the present embodiment, since the distance between the axes of the two-stage sun gear 3 and the pinion gear 2 is reduced by the internal gear part 3a being the larger gear part of the two-stage sun gear 3, the diameter of the larger gear part of the two-stage sun gear 3 can be made large, thereby providing a large difference in the number of teeth between the larger gear part and smaller gear part of the two-stage sun gear 3.

Figure 4A:
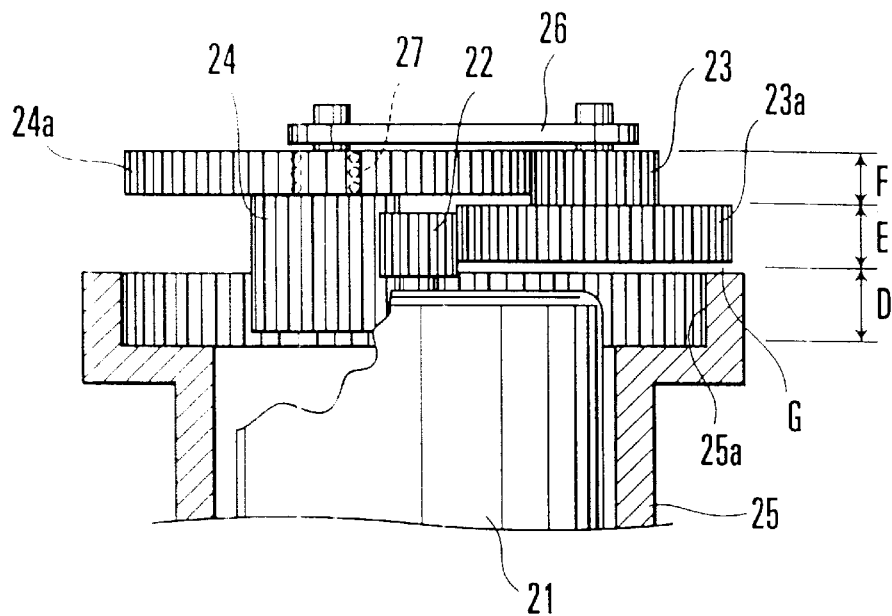
FIGS. 4(a) and 4(b) are diagrams showing the construction of another conventional power transmission device.
Figure 4B:
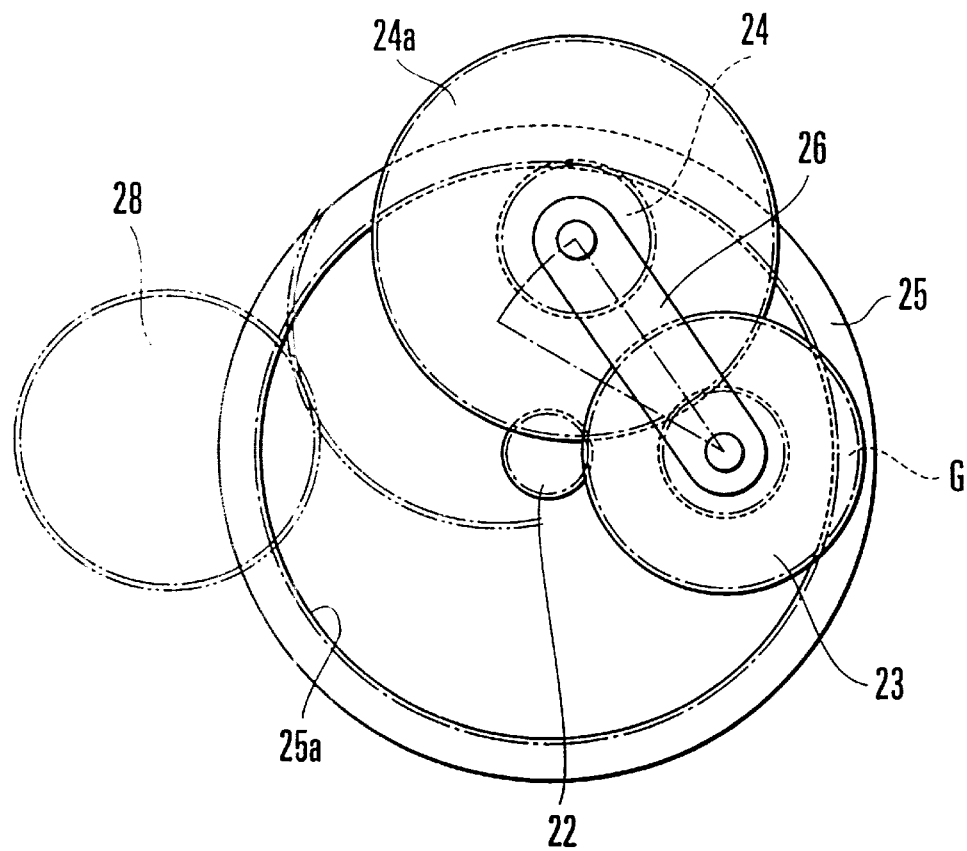

This arrangement means that the power transmission device according to the present embodiment has the advantage equivalent to that of the conventional power transmission device shown in FIGS. 4(a) and 4(b) in which the power loss during transmission is suppressed by reducing the number of gears while the breadth of the device is suppressed as much as possible.

As described in the foregoing, according to the present embodiment, both the breadth and thickness of the power transmission device can be reduced, and the winding and rewinding of film can be performed with reduced power loss in transmission.

Although the power transmission device according to the present embodiment is used in a film transport device, the power transmission device according to the present invention may be used in devices other than the film transport device, as long as the device has such a construction as to transmit a rotational force of a motor to a rotationally-driven member having an internal gear.

Further, although the power transmission device according to the present embodiment includes a planetary mechanism, the present invention may be applied to power transmission devices which do not include the planetary mechanism.

As has been described above, according to the present embodiment, at least a part of an internal gear which has a diameter smaller than that of the internal gear of a driven member is disposed in such a way as to be housed in a space inside the internal gear of the driven member, so that the breadth of the power transmission device as viewed in a direction of the axes of the gears can be made small and the thickness thereof as viewed in a direction perpendicular to the axes of the gears can be reduced. Therefore, it is possible to realize a power transmission device of reduced size as a whole, which does not require a large space for mounting in an optical apparatus.

Besides, when the internal gear which has a diameter smaller than that of the internal gear of the driven member serves as the larger gear part of a two-stage gear, the distance between the axes of the two-stage gear and a gear for transmitting the rotational force of a motor to the two-stage gear can be reduced, so that the diameter of the larger gear part of the two-stage gear can be made large. Therefore, power loss during transmission can be lessened by reducing the number of gears, and a large reduction ratio can be obtained.

In addition, if the power transmission device includes a two-stage sun gear having an internal gear as the larger gear part and an external gear as the smaller gear part formed integrally with the larger gear part, and a two-stage planet gear engaging with the smaller external gear part of the two-stage sun gear and revolvable thereabout, having a first gear part capable of engaging with and disengaging from an internal gear of a driven member (for example, a film winding spool) and a second gear part capable of engaging with and disengaging from another driven member (for example, a gear member included in a driving gear train for driving a spool provided in a film cartridge), it is possible to attain a film transport device or the like of reduced size, which is capable of winding and rewinding film while having a small number of gears, thereby reducing power loss during transmission.

What is claimed is:

1. A power transmission device, comprising:

a motor;

a driven member having an internal gear part;

a first internal gear which is smaller in diameter than the internal gear part of said driven member, said first internal gear being engaged with an output gear of said motor;

another gear, wherein said first internal gear and said another gear transmit a rotational force of said motor to the internal gear part of said driven member, and wherein said first internal gear is disposed inside the internal gear part of said driven member as viewed in a direction of an axis of said first internal gear, and at least a part of said first internal gear is disposed in such a way as to be located inside the internal gear part of said driven member as viewed in a direction perpendicular to the direction of the axis of said first internal gear and;

wherein said first internal gear has an external gear, and wherein the external gear of said first internal gear is engaged with said another gear, and said another gear is engaged with the internal gear part of said driven member.

* * * * *